United States Patent
Naito et al.

(10) Patent No.: US 7,291,537 B2
(45) Date of Patent: Nov. 6, 2007

(54) METHOD FOR PRODUCING SOLID ELECTROLYTIC CAPACITOR

(75) Inventors: Kazumi Naito, Chiba (JP); Shoji Yabe, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/564,821

(22) PCT Filed: Jul. 16, 2004

(86) PCT No.: PCT/JP2004/010526

§ 371 (c)(1),
(2), (4) Date: Jun. 22, 2006

(87) PCT Pub. No.: WO2005/008701

PCT Pub. Date: Jan. 27, 2005

(65) Prior Publication Data

US 2007/0026622 A1    Feb. 1, 2007

Related U.S. Application Data

(60) Provisional application No. 60/489,910, filed on Jul. 25, 2003.

(30) Foreign Application Priority Data

Jul. 18, 2003    (JP) .............................. 2003-199201

(51) Int. Cl.
  *H01L 21/20*    (2006.01)
  *H01G 9/00*    (2006.01)
(52) U.S. Cl. ................ 438/381; 361/523; 257/E21.008
(58) Field of Classification Search ................ 438/381, 438/396, 239, 240; 361/523, 524, 516, 517
See application file for complete search history.

(56) References Cited

U.S. PATENT DOCUMENTS 6,139,592 A * 10/2000 Kamigawa et al. ......... 29/25.03
6,566,186 B1 * 5/2003 Allman et al. ............... 438/239
6,862,169 B2 * 3/2005 Kuroyanagi ................ 361/523

FOREIGN PATENT DOCUMENTS

| JP | 54-127564 A | 10/1979 |
| JP | 3-151622 A | 6/1991 |
| JP | 6-82592 B2 | 10/1994 |
| JP | 6-310382 A | 11/1994 |
| JP | 2000-340466 | * 8/2000 |
| WO | WO 2004/070749 A1 | 8/2004 |

* cited by examiner

*Primary Examiner*—Scott B. Geyer
*Assistant Examiner*—Reema Patel
(74) *Attorney, Agent, or Firm*—Sughrue Mion Pllc.

(57) ABSTRACT

The invention provides a method for producing a solid electrolytic capacitor reliable with good LC value after mounting, wherein a solid electrolytic capacitor element comprises an anode body composed of a material containing at least one selected from a group consisting of an earth-acid metal, an alloy comprising an earth-acid metal as the main component, an electrically conducting oxide of an earth-acid metal and a mixture of two or more thereof, a dielectric layer formed on the anode body by electrolytic oxidation (electrochemical formation) and comprising an oxide as the main component, a semiconductor layer formed on the dielectric layer, and an electrically conducting layer stacked on the semiconductor layer, and the solid electrolytic capacitor element is molded with a resin, cured and then applied voltage (aging) treatment, which method comprises sequentially repeating a step of leaving the resin-molded body to stand at 225 to 305° C. and a step of aging it twice or more after the steps of molding with resin and curing.

6 Claims, No Drawings

METHOD FOR PRODUCING SOLID ELECTROLYTIC CAPACITOR

CROSS-REFERENCE TO RELATED APPLICATIONS

This is an application filed pursuant to 35 U.S.C. Section 111(a) with claiming the benefit of U.S. provisional application Ser. No. 60/489,910 filed Jul. 25, 2003 under the provision of 35 U.S.C. 111(b), pursuant to 35 U.S.C. Section 119(e) (1).

TECHNICAL FIELD

The present invention relates to a method for producing a solid electrolytic capacitor having good heat resistance.

BACKGROUND ART

The capacitor for use in electronic devices such as cellular phone and personal computer is demanded to have a large capacitance with a small size. Among these capacitors, a tantalum solid electrolytic capacitor has a large capacitance for the size and also has good performance and therefore, this is being preferably used. Other than the tantalum solid electrolytic capacitor, a niobium solid electrolytic capacitor using niobium, which is an inexpensive material, for the anode is recently studied. In producing such a solid electrolytic capacitor, a capacitor element comprising a dielectric layer formed on an anode surface by electrochemical formation, a semiconductor layer sequentially stacked on the dielectric layer, and an electrically conducting layer formed on the semiconductor layer is connected to an external terminal and then jacketed to complete the solid electrolytic capacitor. The produced solid electrolytic capacitor is mounted together with other electronic parts on a circuit board or the like and used in practice, but in some cases, the leakage current (hereinafter, simply referred to as "LC") value of the capacitor increases due to heat of soldering at the mounting.

In order to solve this problem, for example, a method of leaving the semiconductor layer to stand at a temperature higher than the curing temperature of jacketing resin and thereby preventing the increase of LC has been proposed in JP-A-6-310382 (the term "JP-A" as used herein means an "unexamined published Japanese patent application").

DISCLOSURE OF THE INVENTION

In recent years, there is a movement to change lead as the main component of a solder to other metals in view of environmental protection. In this case, the mounting temperature becomes higher than in the case of using a conventional solder and therefore, the solid electrolytic capacitor mounted is also demanded to have higher heat resistance. For satisfying this requirement, the above-described method is sometimes insufficient in the effect of improving the heat resistance and more improvements are demanded.

As a result of intensive investigations to solve this problem, the present inventors have found that the increase of LC at mounting is attributable to the thermal instability of the dielectric layer and when an operation of repairing the thermal deterioration of LC is applied twice or more to the produced solid electrolytic capacitor, the problem can be solved. The present invention has been accomplished based on this finding.

That is, the present invention relates to a method for producing a solid electrolytic capacitor, a solid electrolytic capacitor obtained by the method, and an electronic circuit and an electronic device each using the solid electrolytic capacitor, which are described below.

1. A method for producing a solid electrolytic capacitor, wherein a solid electrolytic capacitor element comprises an anode body composed of a material containing at least one member selected from a group consisting of an earth-acid metal, an alloy comprising an earth-acid metal as the main component, an electrically conducting oxide of an earth-acid metal and a mixture of two or more thereof, a dielectric layer formed on the anode body by electrolytic oxidation (electrochemical formation) and comprising an oxide as the main component, a semiconductor layer formed on the dielectric layer, and an electrically conducting layer stacked on the semiconductor layer, and the solid electrolytic capacitor element is subjected to molding with a resin, curing and then voltage applying (aging) treatment, which method comprises repeating a step of leaving the resin-molded body to stand at a temperature of 225 to 305° C. and a step of aging it are sequentially repeated twice or more after the above steps of molding with resin and curing.

2. The method for producing a solid electrolytic capacitor as described in 1 above, wherein the step of leaving the resin-molded body to stand at a temperature of 225 to 305° C. is a step of performing the standing at a temperature of 225 to 305° C. multiple times.

3. The method for producing a solid electrolytic capacitor as described in 1 above, wherein the aging step after leaving the resin-molded body to stand at a temperature of 225 to 305° C. is a step of cooling the resin-molded body to a temperature of 200° C. or less to cold-resistance temperature of the capacitor and then applying a voltage.

4. The method for producing a solid electrolytic capacitor as described in 1 to 3 above, wherein the earth-acid metal is tantalum.

5. The method for producing a solid electrolytic capacitor as described in 1 to 3 above, wherein the earth-acid metal is niobium.

6. The method for producing a solid electrolytic capacitor as described in 1 to 3 above, wherein the electrically conducting oxide of an earth-acid metal is niobium oxide.

7. A solid electrolytic capacitor manufactured by the production method described in any one of 1 to 6 above.

8. An electronic circuit using the solid electrolytic capacitor described in 7 above.

9. An electronic device using the solid electrolytic capacitor described in 7 above.

One mode of the production method for a capacitor of the present invention is described below.

The anode body of the electrode for the capacitor of the present invention comprises a material containing at least one member selected from a group consisting of an earth-acid metal, an alloy comprising an earth-acid metal as the main component, an oxide of an earth-acid metal, and a mixture of two or more thereof.

The "main component" used herein means a component contained to a concentration of 50 mass % or more. The capacitor electrode used herein may have any shape of a foil, a plate, a bar and a sintered body. The surface of the electrode may be etched to enlarge the surface area. In the case of a sintered body shape, the electrode can be usually produced by shaping a powder (raw material powder) of the above-described metal, alloy, oxide or mixture together with a binder into an appropriate shape and after or while removing the binder, sintering the shaped article. The method for producing a sintered body-shaped electrode (hereinafter, simply referred to as a "sintered body") is not particularly limited, but one example thereof is described below.

First, the raw material powder is press-formed into a predetermined shape to obtain a shaped article. This shaped article is heated at 500 to 2,000° C. for a few minutes to a few hours under $10^{-4}$ to $10^{-1}$ Pa to obtain a sintered body. Here, a part of a metal wire comprising a valve-acting metal such as tantalum, niobium and aluminum as the main component may be embedded in the shaped article at the shaping and sintered simultaneously with the shaped article, so that the metal wire in the portion protruded from the sintered body can be used as the leading-out line of the sintered body. Also, the metal wire may be connected by welding or the like after the sintering and used as the anode leading-out line. The diameter of such a metal wire is usually 1 mm or less.

Instead of using a metal wire, the above-described powder may be attached to a valve-acting metal foil such as tantalum and niobium and sintered to produce a sintered body where a part of the valve-acting metal foil is working as the anode leading-out part.

In the present invention, the earth-acid metal means an element belonging to Group 5 of the Periodic Table, specifically, vanadium, tantalum or niobium. The earth-acid metal is preferably tantalum or niobium. Examples of the alloy comprising an earth-acid metal as the main component include those comprising tantalum and/or niobium as the main component and containing, as an alloy component, at least one element selected from the group consisting of elements belonging to Groups 2 to 16 of the Periodic Table. Examples of the electrically conducting oxide of an earth-acid metal include tantalum oxide and niobium oxide. A representative example thereof is niobium monoxide. Also, a part of the earth-acid metal, alloy or electrically conducting oxide of an earth-acid metal may be subjected to at least one treatment selected from carbonization, phosphation, boronation, nitridation and sulfidation before use. Examples of the binder which can be used include various acrylic resins, various vinyl resins such as polyvinyl alcohol, various butyral resins, various vinyl acetal resins, camphor and iodide. The binder may be used as a solid or may be used after dissolving or semi-dissolving it in an appropriate solvent. The amount of the binder used is usually from 0.1 to 20 parts by mass per 100 parts by mass of the earth-acid metal, alloy and/or electrically conducting oxide.

In the present invention, an outgoing wire may be connected to the above-described capacitor electrode and used as anode leading-out part. Alternatively, a part of the capacitor electrode may be kept blank without forming thereon a semiconductor layer and an electrically conducting layer which are described later (while a dielectric layer may, but not necessarily, be formed on the part), and the part may be used afterward as anode leading-out part.

Examples of the dielectric layer formed on the surface of the capacitor electrode (anode) include a dielectric layer comprising ditantalum pentoxide or diniobium pentoxide as the main component. Specifically, the dielectric layer comprising ditantalum pentoxide as the main component can be obtained by electrochemically forming the tantalum electrode as the capacitor electrode in an electrolytic solution. The tantalum electrode is electrochemically formed in an electrolytic solution usually by using an aqueous protonic acid solution, for example, an aqueous 0.1 mass % acetic acid solution, an aqueous 0.1 mass % phosphoric acid solution or an aqueous 0.01 mass % sulfuric acid solution.

On the other hand, representative examples of the semiconductor layer formed on the dielectric layer of the present invention include at least one compound selected from an organic semiconductor and an inorganic semiconductor. Specific examples of the organic semiconductor include an organic semiconductor comprising benzopyrroline tetramer and chloranil, an organic semiconductor comprising tetrathiotetracene as the main component, an organic semiconductor comprising tetracyanoquinodimethane as the main component, and an organic semiconductor comprising, as the main component, an electrically conducting polymer obtained by doping a dopant to a polymer containing a repeating unit represented by the following formula (1) or (2):

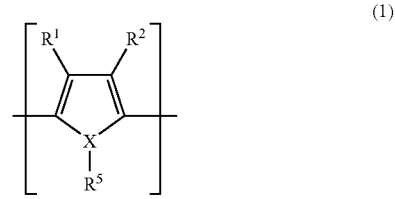

(1)

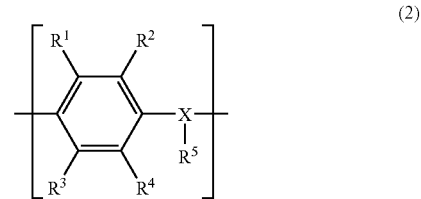

(2)

wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs $R^1$ and $R^2$, and $R^3$ and $R^4$ may combine with each other to form a ring structure.

In the present invention, the electrically conducting polymer containing a repeating unit represented by formula (1) is preferably an electrically conducting polymer containing a structure unit represented by the following formula (3) as a repeating unit:

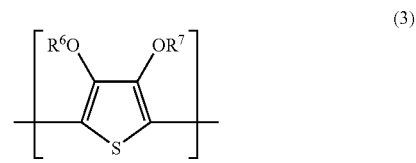

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon ring structure containing two oxygen atoms when the alkyl groups are combined with each other at an arbitrary position, and the ring structure includes a structure having a vinylene bond, which may be substituted, and a phenylene structure which may be substituted.

The electrically conducting polymer containing such a chemical structure is being electrically charged and a dopant is doped therein. For the dopant, known dopants can be used without limitation.

Examples of the polymer containing a repeating unit represented by formula (1), (2) or (3) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

Specific examples of the inorganic semiconductor include at least one compound selected from molybdenum dioxide, tungsten dioxide, lead dioxide and manganese dioxide.

When the organic or inorganic semiconductor used has an electrical conductivity of $10^{-2}$ to $10^3$ S/cm, the capacitor produced can have a small ESR value and this is preferred.

In general, the organic semiconductor has a high possibility of deteriorating due to high temperatures at mounting and therefore, the production method of the present invention is particularly effective when used for a solid electrolytic capacitor using an organic semiconductor.

In the present invention, an electrically conducting layer is provided on the semiconductor layer formed by the above-described method or the like. The electrically conducting layer can be formed, for example, by solidification of an electrically conducting paste, plating, vapor deposition of metal, or lamination of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more pastes, the pastes may be mixed or may be superposed one on another as separate layers. The electrically conducting paste applied is then solidified by leaving it to stand in air or under heating. Examples of the plating include nickel plating, copper plating, silver plating and aluminum plating. Examples of the metal vapor-deposited include aluminum, nickel, copper and silver.

More specifically, for example, carbon paste and silver paste are stacked in this order on the capacitor electrode having formed thereon the semiconductor layer, whereby an electrically conducting layer is formed.

In this way, a solid electrolytic capacitor element is produced, where a dielectric layer, a semiconductor layer and an electrically conducting layer are sequentially stacked on a capacitor electrode.

The solid electrolytic capacitor element having such a constitution of the present invention is jacketed, for example, by resin mold, resin case, metallic jacket case, resin dipping or laminate film and thereby, can be completed as a capacitor product for various uses. In the present invention, a chip solid electrolytic capacitor jacked by resin mold is particularly preferred, because the mounting can be simply performed.

The jacketing by resin mold is specifically described below. A part of the electrically conducting layer of the solid electrolytic capacitor element produced as above is placed on one end part of a separately prepared lead frame having a pair of oppositely disposed end parts, the anode leading-out part (this may be used after cutting the distal end of the anode leading-out part to adjust the dimension) is further placed on the other end part of the lead frame, each is electrically or mechanically joined, for example, the former is joined by solidification of an electrically conducting paste and the latter is joined by spot-welding, the entirety is molded with a resin while leaving a part of the end part of the lead frame unmolded, and the lead frame is cut and bent at predetermined portions outside the resin mold, whereby the solid electrolytic capacitor of the present invention is produced. The lead frame is cut as described above and finally works out to external terminals of the solid electrolytic capacitor. The shape thereof is a foil or tabular form and for the material, iron, copper, aluminum or an alloy comprising such a metal as the main component is predominantly used. The lead frame may be partially or entirely plated with solder, tin, titanium or the like. Between the lead frame and the plating, a primer plating such as nickel or copper may be provided. In the lead frame, a pair of oppositely disposed end parts are present, and a gap is provided between these end parts, so that the anode part and the cathode part of each solid electrolytic capacitor element can be insulated from each other.

As for the resin used in molding of the solid electrolytic capacitor of the present invention, known resins for use in molding of a solid electrolytic capacitor, such as epoxy resin, phenol resin and alkyd resin, can be used. The production machine used for performing the molding with resin is preferably a transfer machine.

The solid electrolytic capacitor molded with a resin is then cured at a predetermined curing temperature of the resin used or around this temperature, usually at a temperature of 150 to 250° C. (depending on the case, the curing of resin may be completed only by the molding temperature (usually from 150 to 200° C.) of the transfer machine).

In the present invention, after the molding with resin and curing, a step of leaving the resin-molded body to stand at a temperature of 225 to 305° C., preferably from 230 to 270° C., and a step of aging it are sequentially repeated twice or more to stabilize the dielectric layer, but the addition of a step of performing an aging treatment before repeating these two steps is also included in the scope of the present invention.

The standing time at a high temperature is from a few seconds to tens of hours. After standing at a high temperature, it is necessary to once lower the temperature to 200° C. or less, preferably 150° C. or less, more preferably 80° C. or less, still more preferably room temperature or less. The temperature can be lowered to a cold resistance temperature (generally −55° C.) of the capacitor produced. The standing at a high temperature may be performed in an air atmosphere or in a gas atmosphere of Ar, $N_2$, He or the like, and also may be performed under reduced pressure, atmospheric pressure or applied pressure. When the standing at a high temperature is performed while supplying water vapor, probably for the reason that the stabilization of the dielectric layer is accelerated, the LC value after mounting of the produced capacitor is sometimes more improved. The water vapor can be supplied, for example, by a method of supplying water vapor generated due to heat from a water reservoir placed in a furnace used for the standing at a high temperature.

In the above, the maximum temperature when leaving the solid electrolytic capacitor to stand in a high-temperature atmosphere is described. Before reaching this temperature, the temperature of the capacitor may be gradually elevated from a low temperature to reach the maximum temperature. The temperature elevating method can be arbitrarily selected. Incidentally, fluctuation of the above-described maximum temperature due to properties of the apparatus, for example, fluctuation within about ±30° C. range, does not adversely affect the invention. Also, even if the temperature is set to give an artificial fluctuation of heat at the maximum temperature, this has fundamentally no problem. Furthermore, a temperature pattern of leaving the capacitor to stand in a high-temperature range multiple times, for example, standing at a maximum temperature, once lowering to an arbitrary low temperature, and further standing at an arbitrary temperature of 225 to 305° C., may also be employed. In other words, the matter of importance is to leave the capacitor at least once at a temperature of 225 to 305° C. In the present invention, the temperature for the standing at a high temperature is 305° C. or less. If this temperature exceeds 305° C., the dielectric layer is not stabilized but rather becomes defective and this is not preferred.

The aging is performed by applying a predetermined voltage to the solid electrolytic capacitor. The optimal values of the aging time and temperature vary depending on the kind of capacitor, the capacitance and the voltage. Therefore, for example, the conditions for causing the reduction of LC value to 0.1 CV or less at the aging temperature are determined by previously performing an experiment, but the aging is usually performed for a time period of several minutes to several days at a temperature of 300° C. or less in consideration for heat deterioration of the jig for applying a voltage. The aging may be performed in an air atmosphere or in a gas atmosphere of Ar, N2, He or the like, and also may be performed under reduced pressure, atmospheric pressure or applied pressure. When the aging is performed while or after supplying water vapor, the stabilization of the dielectric layer is sometimes accelerated. The water vapor can be supplied, for example, by a method of supplying water vapor generated due to heat from a water reservoir placed in a furnace used for the aging.

As for the method of applying a voltage, it can be designed to pass an arbitrary current such as direct current, alternating current having an arbitrary waveform and alternating current superposed on direct current. It is also possible to once stop applying a voltage on the way of aging and again apply a voltage.

The reason why good heat resistance can be obtained by sequentially repeating the high-temperature standing step and the aging step twice or more in the present invention is not clearly known, but this is considered as follows. The deterioration of the dielectric layer due to the heat itself (and the thermal stress of resin for molding) at the mounting is severer than expected and cannot be repaired by an ordinary aging treatment. However, by performing the above-described two steps twice or more to once deteriorate the dielectric layer by the standing at a high temperature and recover it by aging, the larger number of times deterioration/recovery operation is performed, the more thermal experience the dielectric layer already passes through, and therefore, the dielectric layer can endure thermal stress at the mounting, whereby the dielectric layer can be stabilized and the heat deterioration at the mounting can be decreased.

The capacitor produced in the present invention can be preferably used, for example, for circuits using a high-capacitance capacitor, such as electric power circuit. These circuits can be used in various digital devices such as personal computer, sever, camera, game machine, DVD, AV equipment and cellular phone, and electronic devices such as various electric power sources. The capacitor produced in the present invention does not cause increase of leakage current after mounting and therefore, by using this capacitor, electronic circuits and electronic devices having a low initial failure rate can be obtained.

BEST MODE FOR CARRYING OUT THE INVENTION

The present invention is described in greater detail below by referring to Examples, however, the present invention is not limited to these Examples.

EXAMPLES 1 TO 5 AND COMPARATIVE EXAMPLES 1 AND 2

A sintered body having a size of 4×3.2×1.7 mm was produced by using 0.12 g of tantalum powder having CV of 80,000 μF·V/g (sintering condition: temperature of 1,340° C. and 30 minutes, density of sintered body: 5.5 g/cm$^3$, Ta lead wire: 0.29 mmφ). This sintered body except for a part of the lead wire was dipped in an aqueous 0.1 mass % phosphoric acid solution and by applying a voltage of 18 V between the sintered body and a Ta plate electrode as the negative electrode, the sintered body was electrochemically formed at 80° C. for 3 hours to form a dielectric layer comprising $Ta_2O_5$. Subsequently, a semiconductor layer was formed on the surface of the dielectric layer according to the method described in Japanese Patent No. 2,054,506 where the sintered body is subjected to an oxidizing agent treatment by dipping it in an oxidizing agent and then to electrolytic polymerization. More specifically, a step of sequentially performing polymerization and post-electrochemical formation, that is, performing the polymerization at room temperature for 5 hours while applying a voltage of 14 V between the sintered body and the negative electrode (Ta plate electrode) at the electrolytic polymerization by using an aqueous 13 mass % anthraquinonesulfonic acid solution as the oxidizing agent, ethylenedioxythiophene (used in the form of an aqueous solution where the monomer concentration was lower than the saturated concentration) as the monomer, anthraquinone-sulfonic acid as the dopant, and water as the solvent, and then performing post-electrochemical formation at 13 V in an aqueous 0.1 mass % acetic acid solution, was repeated 6 times to form a semiconductor layer.

On this semiconductor layer, carbon paste and silver paste were sequentially stacked to produce a capacitor element.

Next, on two protruded parts of a separately prepared lead frame having a tin-plated surface, the lead wire of the sintered body was laid in the anode side, the silver paste side of the sintered body was laid in the cathode side, the former was connected by spot welding and the latter was connected by a silver paste. Thereafter, the entirety excluding a part of the lead frame was molded with epoxy resin by transfer molding and the lead frame was cut at predetermined positions outside the resin mold and then bent to produce a chip solid electrolytic capacitor having a size of 7.3×4.3×2.8 mm.

Multiple units (30 units in each Example, 210 units in total) of the thus-produced capacitor were prepared and a step of heat-treating the capacitor (after heating, the temperature was lowered to room temperature) and a step of aging it were performed under the conditions shown in Table 1.

In the mounting test of produced capacitor, a capacitor fixed on a substrate by a lead-less cream solder was passed three times through a reflow furnace set to a temperature pattern having 260° C. for 15 seconds on the way to the maximum temperature of 280° C. and then, the LC value (a value at 4V and room temperature for 30 seconds) was measured. The measurement results of 30 units (n=30) in each Example are shown in Table 2 by the number of units of 0.1 CVμA (C: capacitance of capacitor, V: rated 4 V) or less (non-defective ratio).

EXAMPLES 6 AND 7 AND COMPARATIVE EXAMPLES 3 TO 5

A niobium primary powder (average particle size: 0.5 μm) ground by utilizing the hydrogen embrittlement of a niobium ingot was granulated to obtain a niobium powder having an average particle size of 100 μm and containing 85,000 ppm of oxygen (this niobium power was a fine powder and therefore, naturally oxidized). The obtained niobium powder was left standing in a nitrogen atmosphere at 450° C. and further in Ar at 700° C. to provide a partially nitrided niobium powder (CV: 150,000 μF·V/g) having a nitrided amount of 11,000 ppm. The resulting niobium powder was shaped together with a 0.29 mmϕ niobium wire and then sintered at 1,300° C. In this way, multiple sintered bodies (anodes) having a size of 4.0×3.5×7 mm (mass: 0.08 g) were produced (30 units in each Example, 150 units in total). Each sintered body was electrochemically formed in an aqueous 0.1 mass % phosphoric acid solution at 80° C. and 20 V for 10 hours to form a dielectric layer comprising niobium oxide as the main component on the anode surface. Subsequently, a semiconductor layer was formed on the dielectric layer surface by a method described in International PCT Patent Application No. PCT/JP2004/001235 where fine defective portions are produced in the dielectric layer and then a current is passed. More specifically, ethylenedioxythiophene and an aqueous solution having dissolved therein anthraquinonesulfonic acid and ammonium persulfate were introduced on the dielectric layer to attach fine polymer particles, thereby producing fine defective portions, and thereafter, an operation of sequentially performing polymerization and post-electrochemical formation, that is, performing the polymerization at room temperature for 7 hours while applying a voltage of 13 V between the sintered body and the negative electrode (Ta plate electrode) at the electrolytic polymerization by using ethylenedioxythiophene (used in the form of an aqueous solution where the monomer concentration was lower than the saturated concentration) as the monomer, anthraquinonesulfonic acid as the dopant, and water as the solvent, and then performing post-electrochemical formation at 14 V in an aqueous 0.1 mass % acetic acid solution, was repeated 8 times to form a semiconductor layer. Thereafter, the same procedure as in Example 1 was performed to obtain a chip solid electrolytic capacitor.

Multiple units (30 units in each Example, 150 units in total) of the thus-produced capacitor were prepared and a step of heat-treating the capacitor and a step of aging it were performed under the conditions shown in Table 1.

EXAMPLE 8

Chip solid electrolytic capacitors were produced in the same manner as in Example 6 except that the step of heat-treating the capacitors was performed in the presence of water vapor by placing a container containing water in the furnace.

EXAMPLE 9

Chip solid electrolytic capacitors were produced in the same manner as in Example 6 except that the capacitors were left standing in moisture-controlled chamber of 90% RH at 60° C. for 24 hours before the respective aging steps.

In the mounting test of produced capacitor, a capacitor fixed on a substrate by a lead-less cream solder was passed three times through a reflow furnace set to a temperature pattern having 230° C. for 30 seconds on the way to the maximum temperature of 260° C. and then, the LC value (a value at 4V and room temperature for 30 seconds) was measured. The measurement results of 30 units (n=30) in each Example are shown in Table 2 by the number of units of 0.1 CVμA (C: capacitance of capacitor, V: rated 4 V) or less (non-defective ratio).

TABLE 1

| | | Standing under Heat | | | Aging | | |
|---|---|---|---|---|---|---|---|
| | | Temperature (° C.) | Time (min) | Voltage (V) | Temperature (° C.) | Time (hr) | Total Number of Operations |
| Example | 1 | 230 | 0.5 | 6.5 | 105 | 3 | 7 |
| | 2 | 250 | 0.5 | 6.5 | 105 | 3 | 6 |
| | 3 | 250 | 0.5 | 6.5 | 105 | 3 | 2 |
| | 4 | 270 | 0.2 | 6.5 | 105 | 6 | 6 |
| | 5 | 300 | 0.1 | 6.5 | 105 | 10 | 6 |
| | 6 | 230 | 0.5 | 4.5 | 85 | 8 | 8 |
| | 7 | 250 | 0.2 | 4.5 | 85 | 8 | 6 |
| | 8 | 230 | 0.5 | 4.5 | 85 | 8 | 8 |
| | 9 | 230 | 0.5 | 4.5 | 85 | 8 | 8 |
| Comparative Example | 1 | 220 | 0.5 | 6.5 | 105 | 3 | 7 |
| | 2 | 230 | 0.5 | 6.5 | 105 | 3 | 1 |
| | 3 | 220 | 1 | 4.5 | 85 | 8 | 8 |
| | 4 | 230 | 0.5 | 4.5 | 85 | 8 | 1 |
| | 5 | 310 | 0.1 | 4.5 | 85 | 10 | 6 |

TABLE 2

| | | Initial Value of Product | | Non-Defective Ratio |
|---|---|---|---|---|
| | | Capacitance (μF) | LC (μA) | after Mounting |
| Example | 1 | 453 | 6 | 30/30 |
| | 2 | 445 | 8 | 30/30 |
| | 3 | 448 | 5 | 30/30 |
| | 4 | 441 | 10 | 30/30 |
| | 5 | 428 | 24 | 30/30 |
| | 6 | 476 | 19 | 30/30 |
| | 7 | 455 | 21 | 30/30 |
| | 8 | 485 | 14 | 30/30 |
| | 9 | 488 | 12 | 30/30 |
| Comparative Example | 1 | 456 | 5 | 28/30 |
| | 2 | 458 | 4 | 23/30 |
| | 3 | 481 | 17 | 25/30 |
| | 4 | 479 | 16 | 11/30 |
| | 5 | 497 | 157 * | 0/5 |

In each Example, values shown are average values of 30 units (n = 30).
* Since 25 units were defective (exceeding 0.1 CV), the value shown is the average value of remaining 5 units.

As seen from comparison of Example 1 to 5 with Comparative Examples 1 and 2 and comparison of Examples 6 to 9 with Comparative Examples 3 to 5, LC after mounting is stabilized when the step of leaving the capacitor to stand at a temperature of 225 to 305° C. and the step of aging it are sequentially repeated twice or more.

INDUSTRIAL APPLICABILITY

According to the method for producing a solid electrolytic capacitor of the present invention, where a capacitor element comprising an anode body, a dielectric layer on the anode body, a semiconductor layer thereon and an electrically conducting layer stacked on the semiconductor layer is molded with resin and cured and thereafter, a step of leaving the resin-molded body to stand at a temperature of 225 to 305° C. and a step of aging it are repeated twice of more, a solid electrolytic capacitor improved in the leakage current (LC) value after mounting can be obtained.

The invention claimed is:
1. A method for producing a solid electrolytic capacitor, wherein a solid electrolytic capacitor element comprises an anode body composed of a material containing at least one member selected from a group consisting of an earth-acid metal, an alloy comprising an earth-acid metal as the main component, an electrically conducting oxide of an earth-acid metal and a mixture of two or more thereof; a dielectric layer formed on the anode body by electrolytic oxidation (electrochemical formation) and comprising an oxide as the main component; a semiconductor layer formed on the dielectric layer; and an electrically conducting layer stacked on the semiconductor layer; and the solid electrolytic capacitor element is subjected to molding with a resin, curing and then a voltage applying (aging) treatment, which method comprises repeating a step of leaving the resin-molded body to stand at a temperature of 225 to 305° C. and a step of aging it are sequentially repeated twice or more after the above steps of molding with resin and curing.

2. The method for producing a solid electrolytic capacitor as claimed in claim 1, wherein the step of leaving the resin-molded body to stand at a temperature of 225 to 305° C. is a step of performing the standing at a temperature of 225 to 305° C. multiple times.

3. The method for producing a solid electrolytic capacitor as claimed in claim 1, wherein the aging step after leaving the resin-molded body to stand at a temperature of 225 to 305° C. is a step of cooling the resin-molded body to a temperature of 200° C. or less to the cold-resistance temperature of the capacitor and then applying a voltage.

4. The method for producing a solid electrolytic capacitor as claimed in claim 1, wherein the earth-acid metal is tantalum.

5. The method for producing a solid electrolytic capacitor as claimed in claim 1, wherein the earth-acid metal is niobium.

6. The method for producing a solid electrolytic capacitor as claimed in claim 1, wherein the electrically conducting oxide of an earth-acid metal is niobium oxide.

* * * * *